Patented Apr. 15, 1947

2,418,942

UNITED STATES PATENT OFFICE 2,418,942

METHOD FOR PRODUCING POLYMERIC MATERIALS CONTAINING SULFUR

Paul W. Morgan, Kenmore, N. Y., assignor to E. I. du Pont de Nemours & Company, Wilmington, Del., a corporation of Delaware No Drawing. Application January 19, 1944, Serial No. 518,881

4 Claims. (Cl. 260—230)

This invention relates to polymeric materials, and more particularly it relates to the method of producing polymeric materials containing sulfur.

The term "polymeric material," as used throughout this specification and the appended claims, is intended to designate a macromolecular organic compound containing a recurring unit or units, which units may be cyclic or acyclic in nature, and which are linked together within the compound in chain-like fashion. The compound may be a naturally occurring one or may be partly or wholly synthetic. Cellulose is an example of a naturally occurring polymeric material, while examples of partly or wholly synthetic polymeric materials include such substances as cellulose esters or ethers, the so-called addition polymers including such substances as polyvinyl alcohol and its derivatives, polyacrylic acids and their derivatives, and the so-called condensation polymers, including such substances as the polyesters and polyamides of polycarboxylic acids, synthetic resins and the like. Generally, polymeric materials of the type intended for use with this invention possess an average molecular weight in excess of 1000, and exist in the free state as solids at room temperature and atmospheric pressure.

It is an object of this invention to provide a method of preparing a polymeric material containing sulfur. Another object of this invention is to provide a method of preparing a polymeric material-containing mercaptan (SH) group. A still further object of this invention is to provide a process of preparing the aforementioned polymeric materials, which process is easy of accomplishment and readily controlled. Other objects of the invention will appear hereafter.

The objects of this invention are, in general, accomplished by reacting hydrogen sulfide ($H_2S$), in the presence of an excess amount of an organic base, with a reactive group of a polymeric material to yield a mercaptan-containing polymer. Upon reacting two of the said mercaptan groups of the polymeric material in the presence of a mild oxidizing agent, there is produced a cross-linked polymeric material that exhibits a materially lower solubility in water or common organic solvents than the original polymer or its mercaptan derivative.

The present invention will be more clearly understood by reference to the following detailed example, it being understood, however, that this example is illustrative and that the scope of the invention is not to be limited thereto. Throughout the example, the parts of substances referred to are parts by weight unless otherwise indicated.

Example 5 parts of cellulose acetate p-toluene sulfonate (prepared by the treatment of cellulose acetate with p-toluene sulfonyl chloride and containing 2.2 acetyl groups and 0.25 p-toluene sulfonate groups per glucose unit) were dissolved in 98 parts pyridine and the solution saturated with hydrogen sulfide at 83° C. during a period of 1½ hours. The solution was then placed in a closed container and allowed to stand at room temperature for an additional period of 64 hours. The product was soluble in acetone, and analysis thereof showed it contained 2.2 acetyl groups, 0.1 mercaptan groups and 0.15 p-toluene sulfonate groups per glucose units. The material, when oxidized with air or a solution composed of 98 parts of alcohol and 2 parts of iodine, became insoluble in acetone and other common organic solvents.

The acetone-soluble material was cast from acetone solutions onto a glass plate to form a thin, transparent film. On standing in air at room temperature for a period of 10 hours, the material became insoluble and gave a negative test for mercaptain groups when tested with sodium nitroprusside solution. The film remained clear and transparent. It retained its original high durability and was not brittle. When treated with a reducing agent, such as thioglycolic acid, it became soluble in acetone and gave a positive mercaptan test.

The above detailed example illustrates an embodiment of the invention utilizing a specific polymeric material containing a specific reactive group, namely, cellulose acetate containing a p-toluene sulfonate reactive group. The present invention is not, however, to be so limited. In its broad scope, the present invention includes the treatment of any polymeric material containing any reactive group which will react with hydrogen sulfide, in the presence of an organic base, to form on said polymeric material a mercaptan-containing functional group.

As examples of other polymeric materials which may contain functional groups which are reactive with hydrogen sulfide (in the presence of an organic base) to produce a polymeric material having mercaptan functional groups, the following may be named: vinyl polymers, polyacrylic compounds, polymeric resins, cellulose derivatives, linear condensation polymers, for example, synthetic resins, synthetic linear condensation polyamides, polyesters, polyethers and polyanhydrides, and the like, provided only that the polymeric material contains, or can be made to contain, a reactive or functional group which is reactive with hydrogen sulfide to produce a polymeric material having a mercaptan-containing functional group.

As examples of reactive groups, which may be contained in the polymeric material to react with hydrogen sulfide in accordance with the invention, the following may be named: any functional ester group taken from the class consisting of halogen esters, sulfate esters and sulfonate esters, for example, mono-, di- or trichloracetates, chlorketals, chloracetals, sulfates, alkyl or aryl sulfates, and alkyl, aralkyl or aryl sulfonates.

As shown by the above example, the reaction of this invention is preferably carried out by dissolving the polymeric material in pyridine and saturating the resulting solution with $H_2S$, the mercaptan-containing product being obtained in the solid state by evaporation of the pyridine or addition of a coagulant, such as water or other non-solvent for the polymer. However, it is not necessary that the polymeric material be dissolved in the pyridine, and satisfactory results can be obtained by merely grinding the polymeric material to a fine particle size and suspending it in a pyridine $H_2S$ solution. On the other hand, the reaction can also be carried out on a pre-formed structure, such as a yarn or film of the polymeric material. Thus, for example, a formed structure such as a sheet of regenerated cellulose can be surface-esterified with p-toluene sulfonyl chloride, the resulting ester then being treated in sheet form with pyridine and $H_2S$ for the replacement of p-toluene sulfonate groups by mercaptan groups.

It is not essential that the reaction be carried out in the presence of pyridine, although highly satisfactory results are obtained with it and it constitutes a useful solvent for many polymeric materials. Other organic bases that can be used in its stead include quinoline, picoline, tertiary aliphatic amines such as triethyl amine, and mixed tertiary amines such as dimethyl aniline.

As indicated above, the mercaptan-containing polymer generally possesses solubility characteristics similar to those of the original polymeric material. This substance can, however, be readily converted to a water-insoluble and organic solvent-insoluble material by treatment with a mild oxidizing agent, such as air, iodine, peroxide, ferricyanide, dilute nitric acid, etc. These oxidized materials contain disulfide groups that serve to cross-link adjacent chains of the polymer. They can, as shown in the example, subsequently be reconverted to the soluble mercaptan state by treatment with a reducing agent, such as thioglycolic acid.

Of course, it is to be understood that in addition to the above reaction, the mercaptan-containing polymers of this invention are also capable of undergoing other reactions typical of the mercaptan group. The products of the invention therefore constitute an important class of intermediate compounds for the preparation of various polymeric derivatives.

This invention provides a simple and easily controlled process for the preparation of sulfur-containing polymeric materials. The process does not give rise to the formation of undesirable by-products, and the polymeric material finally obtained is substantially free of such substances and possesses a light color.

Since it is obvious that many changes and modifications can be made in the above-described details without departing from the nature and spirit of the invention, it is to be understood that the invention is not to be limited to the details described herein except as set forth in the appended claims.

I claim:

1. A method which comprises reacting hydrogen sulfide in the presence of pyridine with cellulose acetate p-toluene sulfonate.

2. A method which comprises reacting hydrogen sulfide in the presence of an organic base with a reactive ester group of a saturated polymeric material having an average molecular weight in excess of 1000 to displace said reactive ester group with a mercaptan group, said reactive ester group being selected from the class consisting of halogen, sulfate and sulfonate.

3. A method which comprises reacting hydrogen sulfide in the presence of pyridine with a reactive ester group of a saturated polymeric material having an average molecular weight in excess of 1000 to displace said reactive ester group with a mercaptan group, said reactive ester group being selected from the class consisting of halogen, sulfate and sulfonate.

4. A method which comprises dissolving a saturated polymeric material having an average molecular weight in excess of 1000 and containing a reactive ester group in an organic base, said reactive ester group being selected from the class consisting of halogen, sulfate and sulfonate, and permitting the hydrogen sulfide to react with said ester group whereby said reactive ester group is displaced with a mercaptan group.

PAUL W. MORGAN.

REFERENCES CITED

The following references are of record in the file of this patent:

UNITED STATES PATENTS

| Number | Name | Date |
| --- | --- | --- |
| 2,137,584 | Ott | Nov. 22, 1938 |